United States Patent
Yamada

(10) Patent No.: US 11,085,801 B2
(45) Date of Patent: Aug. 10, 2021

(54) PHYSICAL QUANTITY MEASURING APPARATUS

(71) Applicant: Alps Alpine Co., Ltd., Tokyo (JP)

(72) Inventor: Yukimitsu Yamada, Miyagi-ken (JP)

(73) Assignee: ALPS ALPINE CO., LTD., Tokyo (JP)

(*) Notice: Subject to any disclaimer, the term of this patent is extended or adjusted under 35 U.S.C. 154(b) by 204 days.

(21) Appl. No.: 16/353,190

(22) Filed: Mar. 14, 2019

(65) Prior Publication Data
US 2019/0204125 A1 Jul. 4, 2019

Related U.S. Application Data

(63) Continuation of application No. PCT/JP2017/008460, filed on Mar. 3, 2017.

(30) Foreign Application Priority Data

Sep. 15, 2016 (JP) .............................. JP2016-180805

(51) Int. Cl.
*G01D 18/00* (2006.01)
*G01D 3/00* (2006.01)
(Continued)

(52) U.S. Cl.
CPC ............... *G01D 18/00* (2013.01); *G01D 3/00* (2013.01); *G01C 19/00* (2013.01); *G01P 15/00* (2013.01); *G01P 21/00* (2013.01)

(58) Field of Classification Search
CPC ....... H01L 2924/00; H01L 2224/48091; H01L 2224/48227; H01L 2224/49175;
(Continued)

(56) References Cited

U.S. PATENT DOCUMENTS 3,350,381 A   10/1967   Moeller
5,795,266 A * 8/1998   Hasegawa ........... F16H 61/0213
                                                    477/169
(Continued)

FOREIGN PATENT DOCUMENTS

CN   1269902   10/2000
CN   101517373   3/2013
(Continued)

OTHER PUBLICATIONS

Notification of Refusal from corresponding CN application No. 201780056633.6, 8pgs., dated Oct. 22, 2020.

*Primary Examiner* — Daniel Previl
(74) *Attorney, Agent, or Firm* — Crowell & Moring LLP

(57) ABSTRACT

A physical quantity measuring apparatus has: a plurality of physical quantity sensors of the same type, each of which detects a physical quantity at intervals of a predetermined length of time; a computing unit that calculates an output value according to physical quantities detected by the plurality of physical quantity sensors at each detection time; and a deciding unit that makes a predetermined decision according to an output value calculated about the immediately preceding detection time and to physical quantities detected by the plurality of physical quantity sensors at the current detection time. The computing unit calculates an output value at each detection time according to a decision result of the deciding unit.

4 Claims, 8 Drawing Sheets

(51) Int. Cl.
*G01C 19/00* (2013.01)
*G01P 15/00* (2006.01)
*G01P 21/00* (2006.01)

(58) Field of Classification Search
CPC ... H01L 2924/1461; H01L 2924/00014; H01L 2224/16225; H01L 2924/19105; B60R 19/205; B60R 21/0132; B60R 21/013; B25J 13/08; B25J 9/0006; G01D 11/245; G05B 2219/40305; G06F 13/4291; G06F 13/4295; F02D 2041/283; F02D 2200/0414; F02D 41/187; F02D 41/2474; F02M 35/021; G01C 9/02; G01F 1/684; G01F 1/6842; G01F 1/6965; G01F 1/699; G01P 15/0802; G01P 15/18; G01P 1/023; G01P 2015/0871; G01P 21/00
USPC ....... 340/436, 425.5, 428, 429, 426.25, 438, 340/439–442, 467, 507, 517, 539.22, 571, 340/683
See application file for complete search history.

(56) References Cited

U.S. PATENT DOCUMENTS

| | | | |
|---|---|---|---|
| 6,430,295 | B1 | 8/2002 | Handel et al. |
| 9,501,803 | B2 * | 11/2016 | Bilac ................... H02J 13/0017 |
| 2009/0271142 | A1 | 10/2009 | Yamashita et al. |
| 2009/0276184 | A1 * | 11/2009 | Mylaraswamy ....... G01D 18/00 702/185 |
| 2012/0245895 | A1 | 9/2012 | Rud |
| 2013/0191681 | A1 | 7/2013 | Moiseev et al. |
| 2013/0204568 | A1 | 8/2013 | Kitaura et al. |
| 2014/0115212 | A1 * | 4/2014 | Kazuno ............... G06F 13/4291 710/110 |
| 2014/0350894 | A1 | 11/2014 | Yamashita et al. |
| 2015/0096378 | A1 * | 4/2015 | Kigure .................. G01P 1/003 73/514.32 |
| 2015/0224845 | A1 * | 8/2015 | Anderson ........... B60G 17/052 701/37 |
| 2016/0147373 | A1 | 5/2016 | Nakajima et al. |

FOREIGN PATENT DOCUMENTS

| | | |
|---|---|---|
| CN | 104081161 | 10/2014 |
| CN | 103733030 | 1/2016 |
| CN | 103140812 | 8/2016 |
| CN | 105630232 | 4/2019 |
| JP | 49-4872 B1 | 2/1974 |
| JP | 62-005402 | 1/1987 |
| JP | 2009-271912 A | 11/2009 |

* cited by examiner

PHYSICAL QUANTITY MEASURING APPARATUS

CLAIM OF PRIORITY

This application is a Continuation of International Application No. PCT/JP2017/008460 filed on Mar. 3, 2017, which claims benefit of Japanese Patent Application No. 2016-180805 filed on Sep. 15, 2016. The entire contents of each application noted above are hereby incorporated by reference in their entireties.

BACKGROUND

1. Field of the Disclosure

The present disclosure relates to a physical quantity measuring apparatus having a plurality of physical quantity sensors of the same type.

2. Description of the Related Art

The movement measuring apparatus described in Japanese Unexamined Patent Application Publication No. 2015-217053 converts angular velocity components detected by angular velocity sensors in triaxial directions to a quaternion, and also converts acceleration components detected by acceleration sensors in triaxial directions to a quaternion. The movement measuring apparatus then applies a Kalman filter to the quaternion converted from the angular velocity components to correct the quaternion by using the quaternion converted from the acceleration components as observed values. Thus, the movement measuring apparatus is intended to precisely obtain the motion angles of the lower limbs and the like during walking through a quick computation.

However, the movement measuring apparatus described in Japanese Unexamined Patent Application Publication No. 2015-217053 uses angular velocity sensors and acceleration sensors and also performs filtering in computations. This is problematic in that power consumption is increased, an area used to install circuits, each of which corresponds to one of a plurality of sensors of different types, is enlarged, and a load applied to a calculation circuit is also increased.

In a method of calculating a position, accelerations detected by an acceleration sensor are integrated. However, in a process of integration from an acceleration to a velocity and integration from a velocity to a point, a noise signal included in acceleration data is superimposed. This leads to the problem that it is difficult to calculate a highly precise position.

SUMMARY

A physical quantity measuring apparatus includes: a plurality of physical quantity sensors of the same type, each of which detects a physical quantity at detection times at intervals of a predetermined length of time; a processor that includes a computing unit that calculates an output value according to physical quantities detected by the plurality of physical quantity sensors at each detection time; and a processor that includes a deciding unit that makes a predetermined decision according to an output value calculated about the immediately preceding detection time and to physical quantities detected by the plurality of physical quantity sensors at the current detection time. The computing unit calculates an output value at each detection time according to a decision result of the deciding unit.

Accordingly, it becomes possible to suppress power consumption, the size of the apparatus, and a load applied to a computing circuit and to perform highly precise physical quantity computations by suppressing noise, without using a special filter.

Accordingly, it is possible to suppress power consumption, the size of the apparatus, and a load applied to a computing circuit and to perform highly precise physical quantity computations by suppressing noise, without using a special filter such as a Kalman filter.

DESCRIPTION OF THE EXEMPLARY EMBODIMENTS

A physical quantity measuring apparatus according to an embodiment of the present invention will be described below in detail with reference to the drawings. Although, in this embodiment, a case in which two acceleration sensors are preferably used as physical quantity sensors will be described, the physical quantity sensors in the present invention are not limited to acceleration sensors. The present invention can also be applied to, for example, angular velocity sensor, atmospheric pressure sensors, optical sensors, temperature sensors, weight sensors, and the like.

Figure 1:
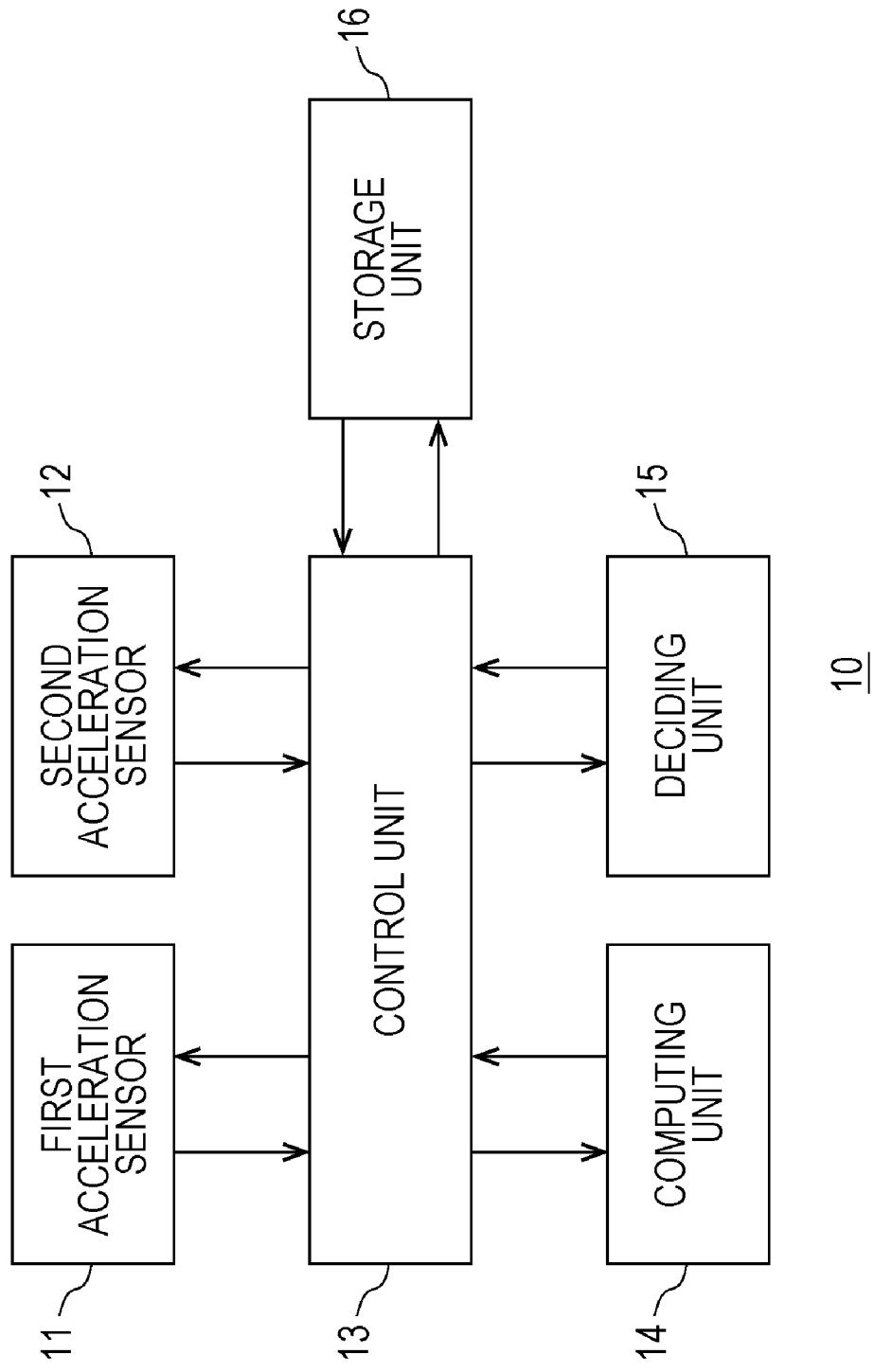
FIG. 1 is a block diagram illustrating the structure of a physical quantity measuring apparatus according to an embodiment of the present invention.

FIG. 1 is a block diagram illustrating the structure of the physical quantity measuring apparatus 10 according to this embodiment. As illustrated in FIG. 1, the physical quantity measuring apparatus 10 has a first acceleration sensor 11, a second acceleration sensor 12, a control unit or controller 13, a computing unit 14, a deciding unit 15, and a storage unit or memory 16.

The first acceleration sensor 11 and second acceleration sensor 12 are of the same type. Each of them detects an acceleration as a physical quantity at detection times at intervals of a predetermined length of time (for example, 10 ms). Detection results are output to the control unit or controller 13. The sensors of the same type are sensors of a single type that detect the same physical quantity on the same principle. The acceleration sensors 11 and 12 detect a force when a mass moves along the direction of acceleration.

They are composed of, for example, a beam that supports a mass and a distortion sensor that detects the distortion of the beam. The amount of distortion detected by the distortion sensor is proportional to the force. Three sensor units, each of which is composed of a mass, a beam, and a distortion sensor, are provided. The distortion direction of each beam is oriented to the direction of one of three axes so that accelerations in the triaxial directions of reference coordinate axes, which are mutually orthogonal.

The control unit or controller 13 controls the operations of the computing unit 14 and deciding unit 15, and outputs data detected by the first acceleration sensor 11 and second acceleration sensor 12 to the computing unit 14 or deciding unit 15 according to the time of detection. Furthermore, the control unit or controller 13 causes the computing unit 14 to calculate a predetermined output value according to a decision result of the deciding unit 15.

At detection times at intervals of the above predetermined length of time, under control of the control unit or controller 13, the computing unit 14 calculates an output value according to accelerations detected by the first acceleration sensor 11 and second acceleration sensor 12. The calculated output values are stored in the storage unit or memory 16 through the control unit or controller 13 and are also output to the deciding unit 15. Under control of the control unit or controller 13, the deciding unit 15 makes a predetermined decision according to an output value calculated by the computing unit 14 about the immediately preceding detection time and to accelerations detected by the first acceleration sensor 11 and second acceleration sensor 12 at the current detection time. This decision result is output through the control unit or controller 13 to the computing unit 14. The computing unit 14 calculates an output value at each detection time according to the decision result of the deciding unit 15.

It is preferable to use the average of accelerations detected by the first acceleration sensor 11 and second acceleration sensor 12 at their first detection times as an initial output value at the time of the activation of the physical quantity measuring apparatus 10.

A decision by the deciding unit 15 is preferably to decide whether an output value calculated by the computing unit 14 about the immediately preceding detection time is present between two accelerations detected by the first acceleration sensor 11 and second acceleration sensor 12 at the current detection time. According to this decision result, the computing unit 14 calculates an output value as in (1) or (2) below.

(1) If the output value calculated about the immediately preceding detection time is present between the two accelerations detected by the first acceleration sensor 11 and second acceleration sensor 12 at the current detection time, the average value of the accelerations detected by the first acceleration sensor 11 and second acceleration sensor 12 at the current detection time is preferably used as the output value about the current detection time.

(2) If the output value calculated about the immediately preceding detection time is not present between the two accelerations detected by the first acceleration sensor 11 and second acceleration sensor 12 at the current detection time, either of the two accelerations detected at the current detection time, whichever is closer to the output value calculated about the immediately preceding detection time, is preferably used as the output value about the current detection time. A decision as to which of the two accelerations detected at the current detection time is closer to the output value calculated about the immediately preceding detection time is also made by the deciding unit 15.

As a failure deciding unit, the deciding unit 15 preferably compares physical quantities detected by the first acceleration sensor 11 and second acceleration sensor 12, and preferably decides whether there is a failure in the physical quantity measuring apparatus 10 (for example, a failure in the first acceleration sensor 11 or second acceleration sensor 12). More specifically, if the value of one of two physical quantities is predetermined times (for example, three times or more) the value of the other, the deciding unit 15 decides that there is a failure.

A decision as the failure deciding unit is executed even in a case in which three are three or more acceleration sensors. If, for example, the value of a physical quantity detected by one acceleration sensor is predetermined times (for example, three times or more) the average value of the physical quantities detected by the remaining acceleration sensors, the deciding unit 15 decides that there is a failure.

Figure 2:
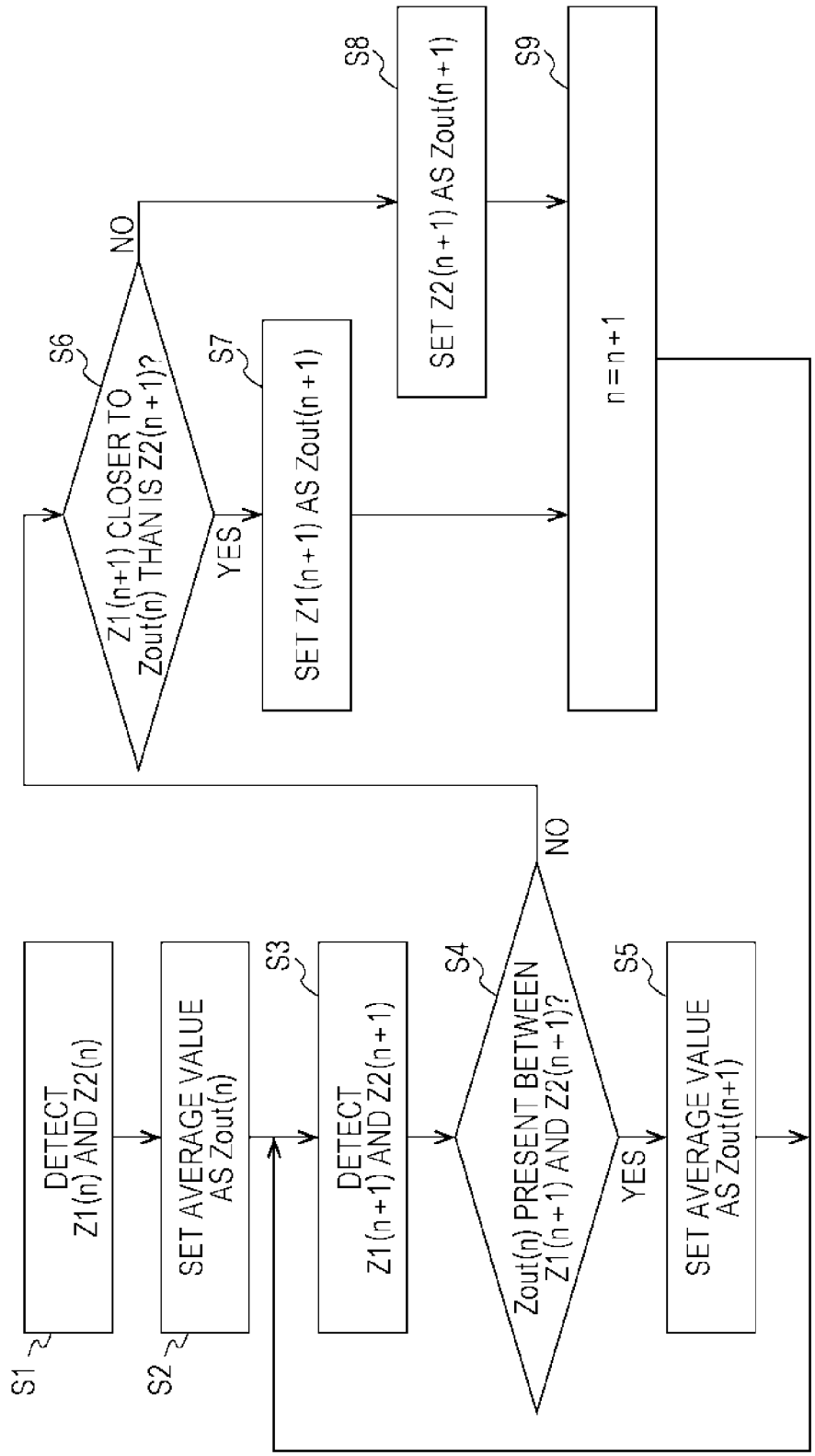
FIG. 2 is a flowchart illustrating a flow of processing of output value setting by the physical quantity measuring apparatus according to an embodiment of the present invention.
Figure 3:
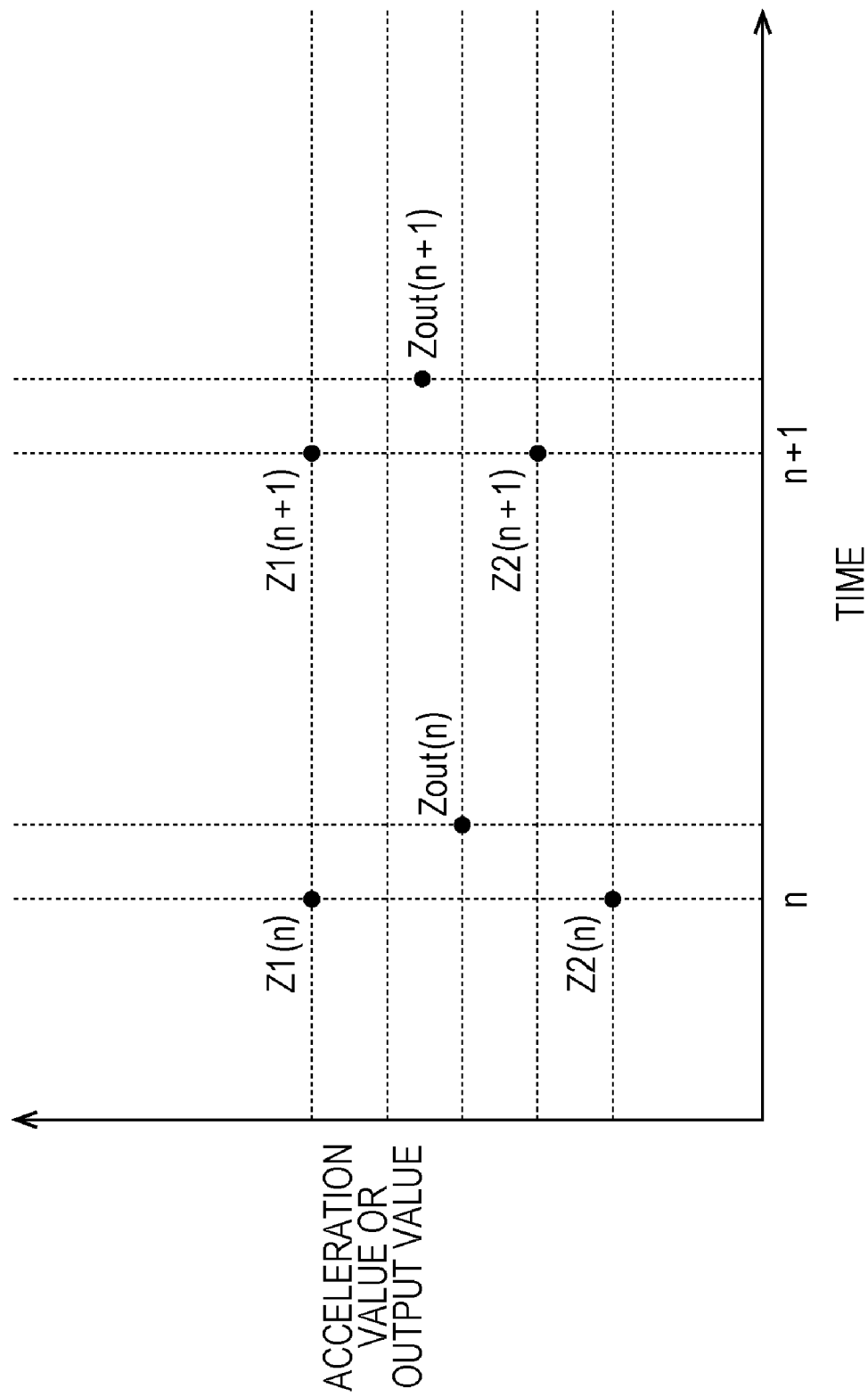
FIG. 3 illustrates detected accelerations and exemplary settings of output values.
Figure 4:
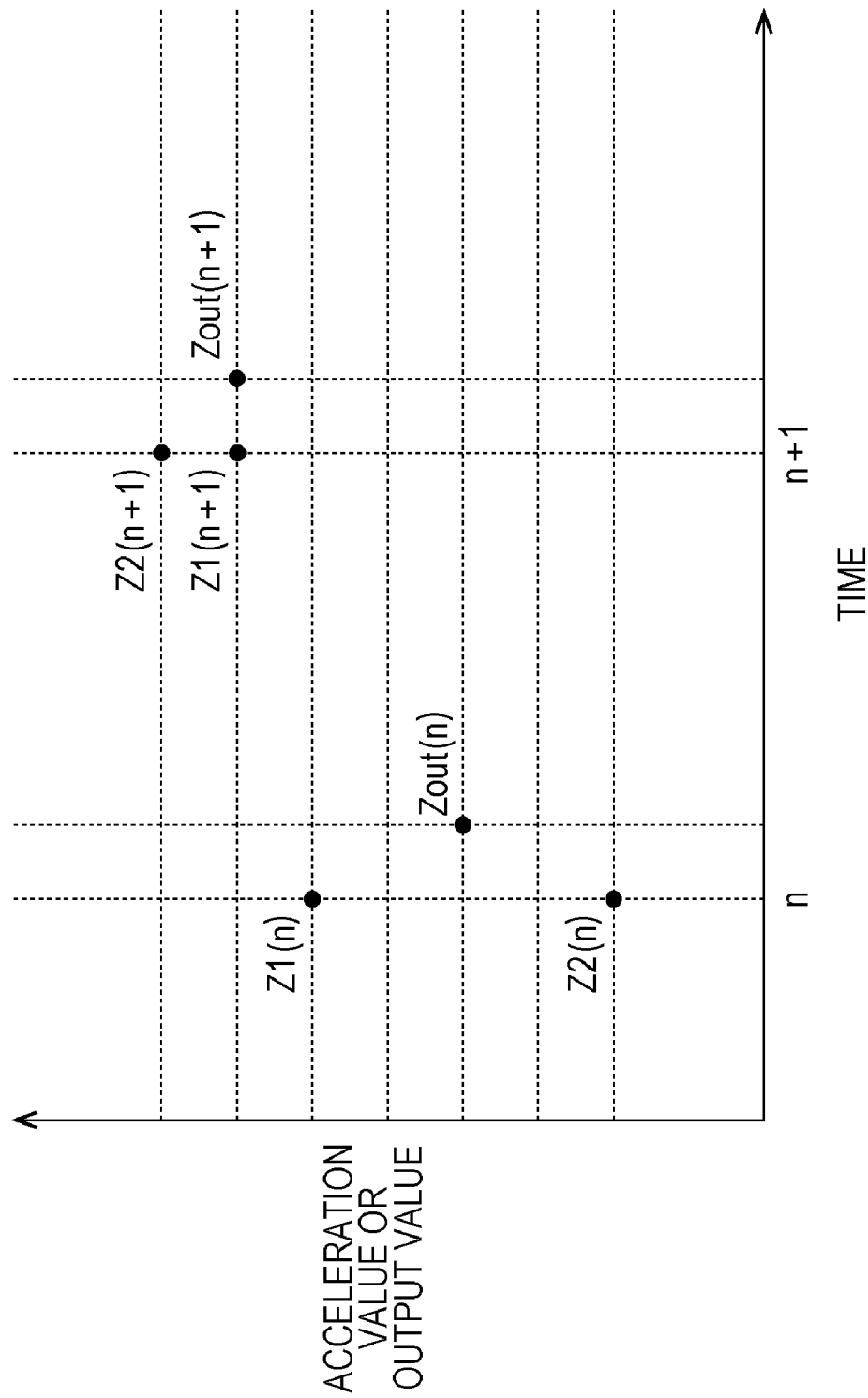
FIG. 4 illustrates detected accelerations and exemplary settings of output values.

FIG. 2 is a flowchart illustrating a flow of processing of output value setting by the physical quantity measuring apparatus 10 in this embodiment. FIGS. 3 and 4 illustrate detected accelerations and exemplary settings of output values. In FIGS. 2 to 4, $Z1(n)$ is an acceleration detected by the first acceleration sensor 11 at detection time n, and $Z2(n)$ is an acceleration detected by the second acceleration sensor 12 at detection time n. Detection time n+1 is a next detection time after detection time n. Zout(n) is an output value calculated by the computing unit 14 at detection time n.

First, first acceleration $Z1(n)$ is detected by the first acceleration sensor 11 and second acceleration $Z2(n)$ is detected by the second acceleration sensor 12 as an initial detection at the time of the activation of the physical quantity measuring apparatus 10 (step S1). These acceleration data items are output to the control unit or controller or controller 13. The control unit or controller 13 commands the computing unit 14 to calculate an average value from the two detected accelerations. The computing unit 14 sets the calculated average value as output value Zout(n) at this time and this output value is stored in the storage unit or memory 16 (step S2). Output value Zout(n) is represented by equation (1) below.

$$Zout(n)=[Z1(n)+Z2(n)]/2 \qquad (1)$$

In a second detection after a predetermined length of time has passed from the detection in step S1 above, the first acceleration sensor 11 detects first acceleration $Z1(n+1)$ and the second acceleration sensor 12 detects second acceleration $Z2(n+1)$ (step S3). These acceleration data items are output to the control unit or controller 13. The control unit or controller 13 causes the deciding unit 15 to decide whether initial output value Zout(n) is present between the two accelerations, $Z1(n+1)$ and $Z2(n+1)$ (step S4). If the time at the second detection is taken as the current detection time, the time at the initial detection becomes the immediately preceding detection time.

As illustrated in FIG. 3, if initial output value Zout(n) is present between the two accelerations, $Z1(n+1)$ and $Z2(n+1)$ (YES in step S4), the control unit or controller 13 causes the computing unit 14 to calculate the average value of the two accelerations, $Z1(n+1)$ and $Z2(n+1)$, the computing unit 14 sets the calculated average value as output value Zout(n+1) at this time, and this output value is stored in the storage unit or memory 16 (step S5). Zout(n+1) is represented by equation (2) below. Although Zout(n) is deviated from detection time n in FIG. 3 and Zout(n+1) is deviated from detection time n+1 in FIG. 4, these deviations are made for convenience of explanation.

$$Zout(n+1)=[Z1(n+1)+Z2(n+1)]/2 \quad (2)$$

If initial output value Zout(n) is not present between the two accelerations, $Z1(n+1)$ and $Z2(n+1)$ as illustrated in FIG. 4 (NO in step S4), the deciding unit 15 further decides whether first acceleration $Z1(n+1)$ is closer to initial output value Zout(n) than is second acceleration $Z2(n+1)$ (step S6).

If first acceleration $Z1(n+1)$ is closer to initial output value Zout(n) than is second acceleration $Z2(n+1)$ (YES in step S6), first acceleration $Z1(n+1)$ is set as output value Zout(n+1) at this detection time (step S7).

If second acceleration $Z2(n+1)$ is closer to initial output value Zout(n) than is first acceleration $Z1(n+1)$ or first acceleration $Z1(n+1)$ and second acceleration $Z2(n+1)$ have the same value (NO in step S6), second acceleration $Z2(n+1)$ is set as output value Zout(n+1) at this detection time (step S8).

After steps S5, S7 and S8 above, processing in step S3 and subsequent steps is repeated by using a next detection time as the current detection time (step S9).

Although, in step S6 above, it has been decided whether first acceleration $Z1(n+1)$ is closer to initial output value Zout(n) than is second acceleration $Z2(n+1)$, it may be decided whether second acceleration $Z2(n+1)$ is closer to initial output value Zout(n) than is first acceleration $Z1(n+1)$. In this case as well, an acceleration closer to initial output value Zout(n) is set as output value Zout(n+1) at this detection time as in steps S7 and S8 above.

Figure 5:
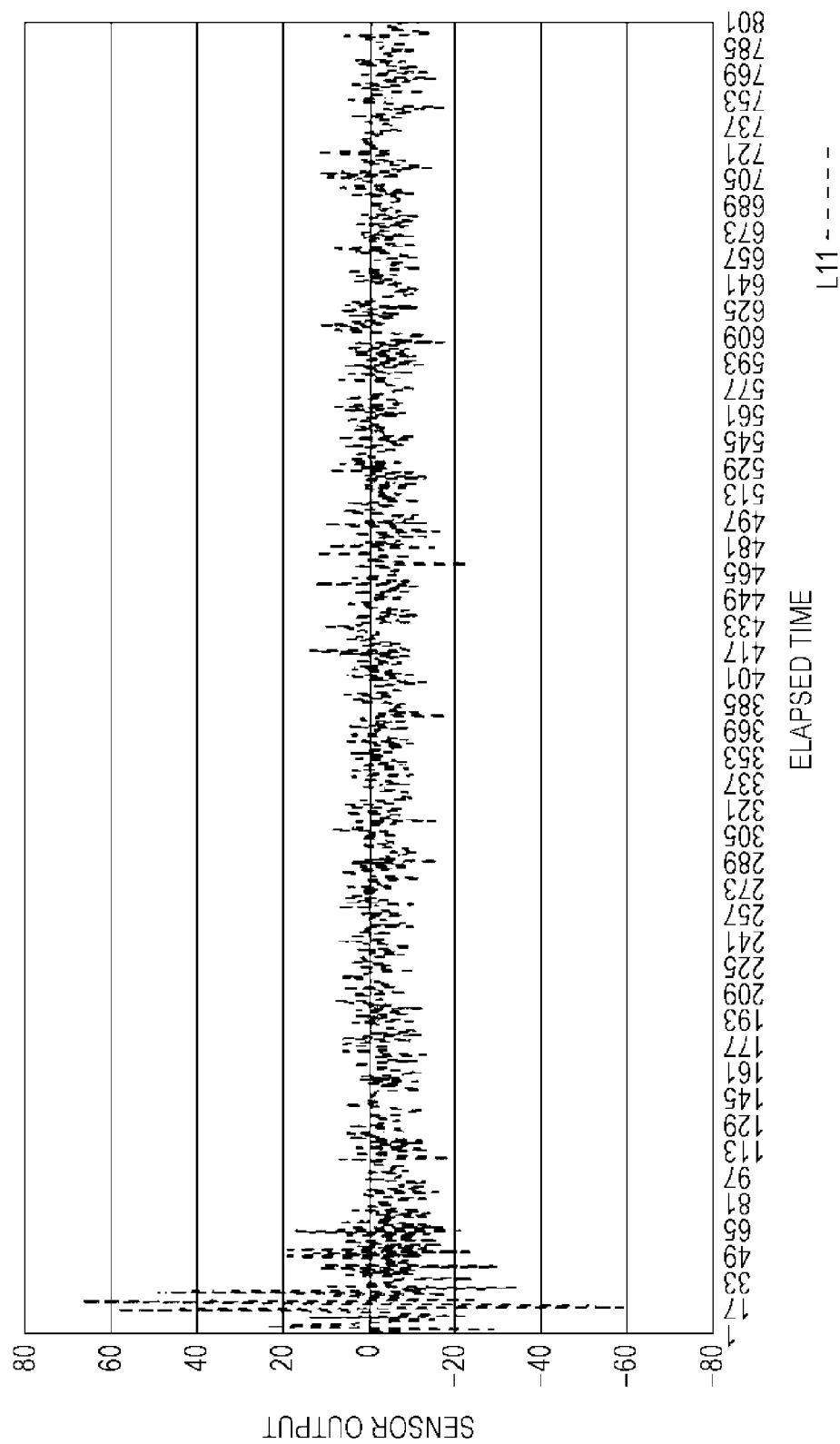
FIG. 5 is a graph illustrating changes in detected outputs with elapsed time when one acceleration sensor is placed in a stationary state.
Figure 6:
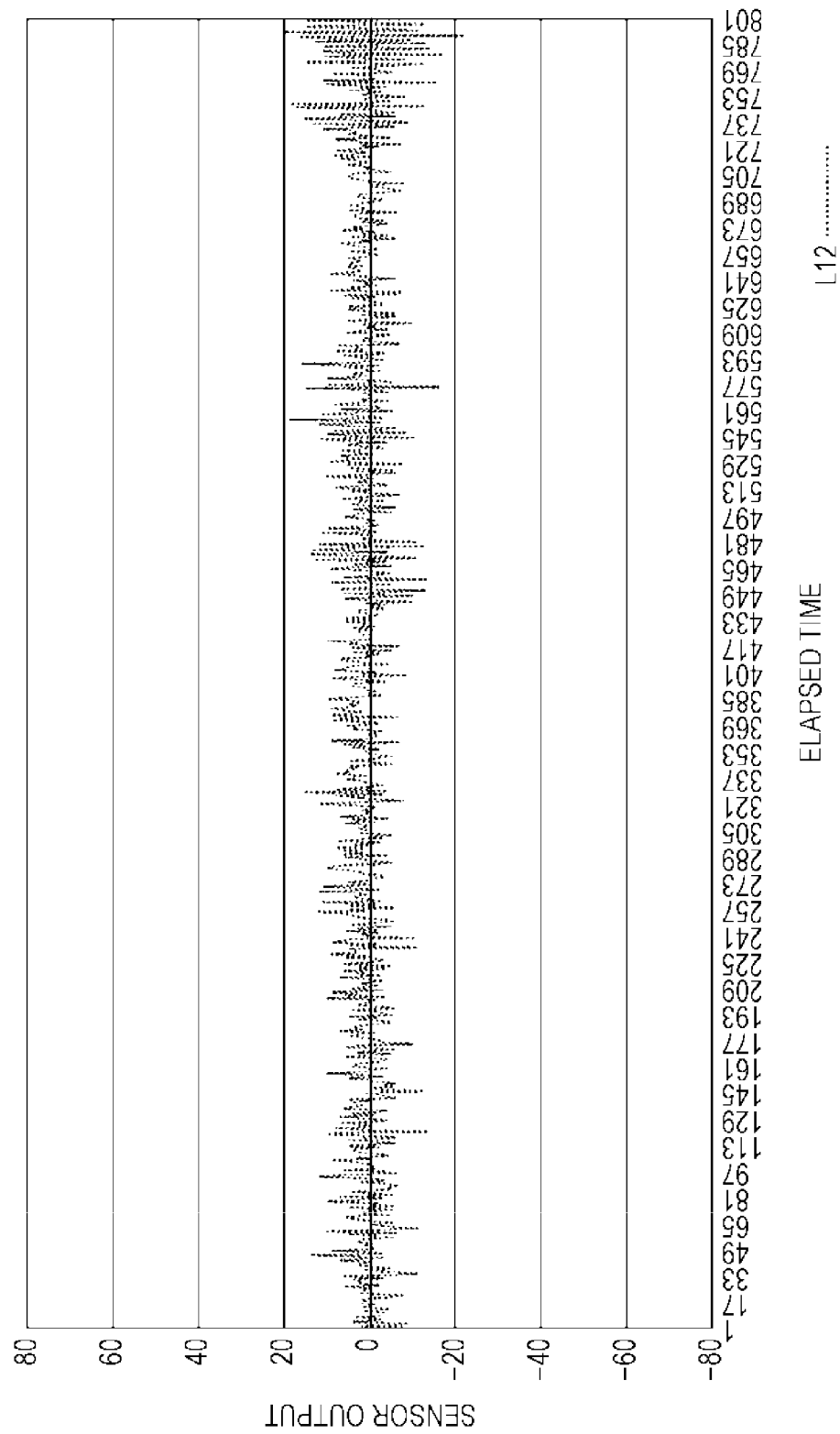
FIG. 6 is a graph illustrating changes in average values of detected outputs with elapsed time when two acceleration sensors are placed in a stationary state.
Figure 7:
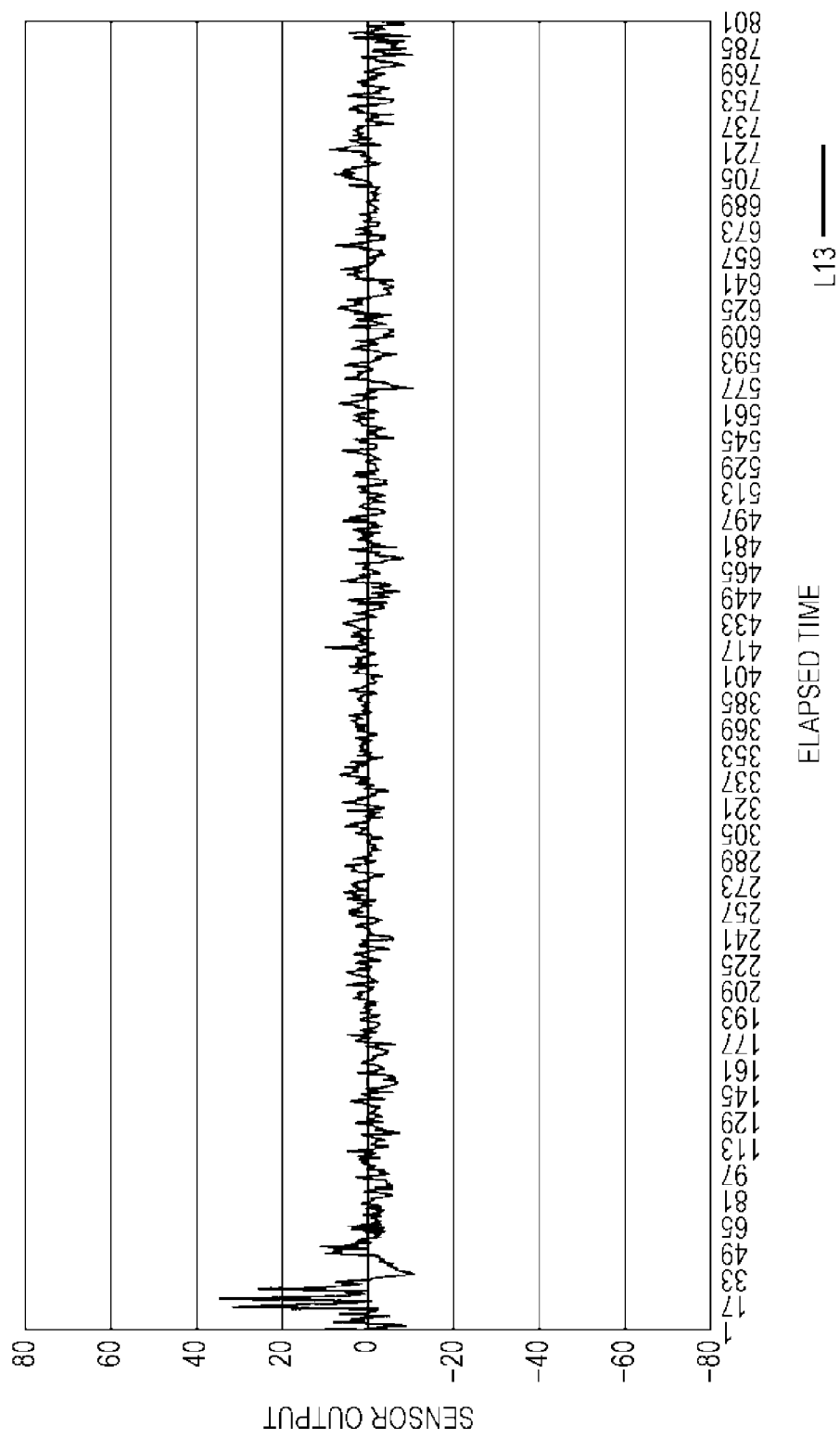
FIG. 7 is a graph illustrating changes in output values with elapsed time when the physical quantity measuring apparatus is placed in a stationary state.
Figure 8:
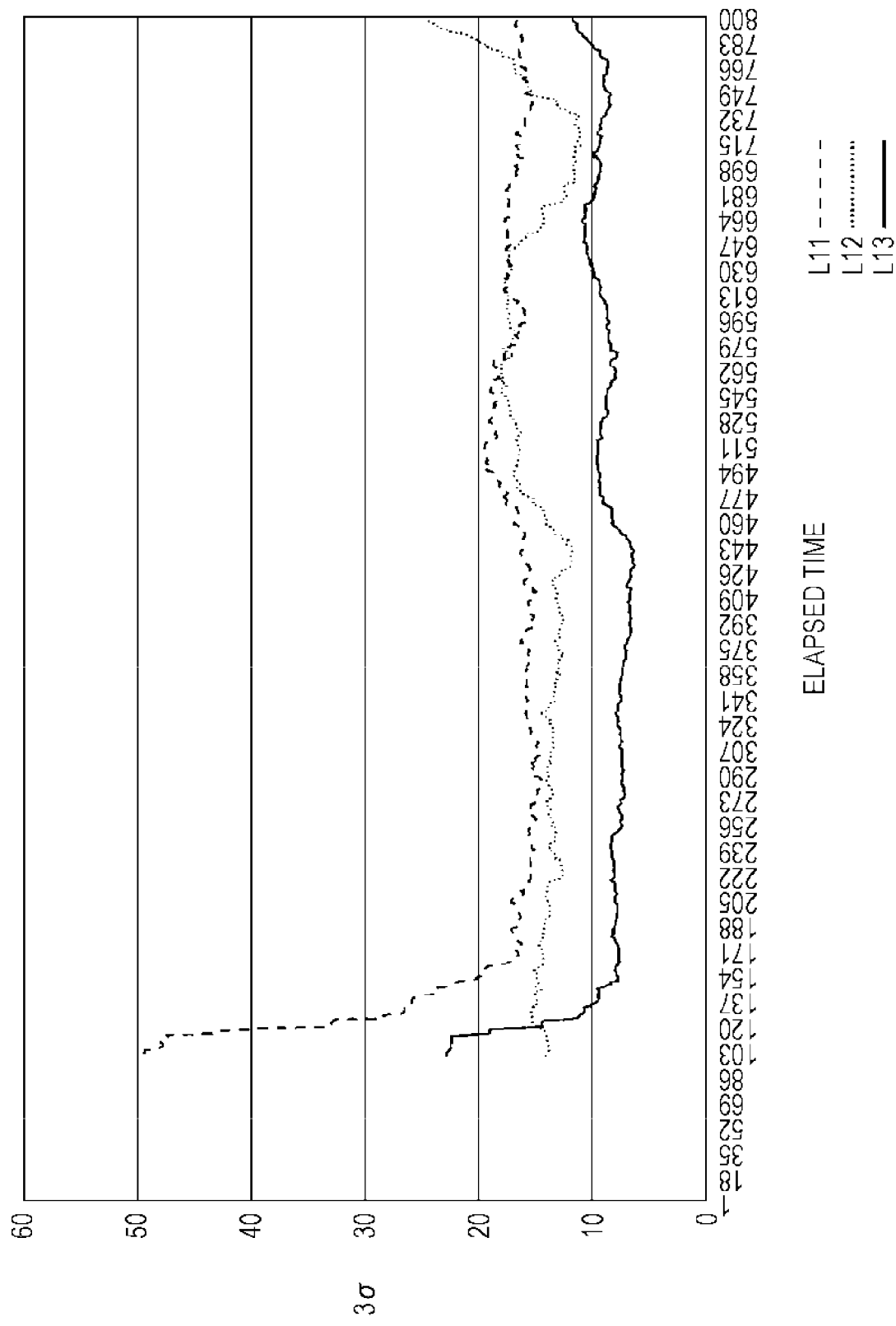
FIG. 8 is a graph illustrating changes in $3\sigma$ calculated from values in FIGS. 5 to 7 with elapsed time.

FIGS. 5 to 7 are each a graph illustrating changes in outputs with elapsed time when one or two acceleration sensors or a physical quantity measuring apparatus is placed in a stationary state. FIG. 5 indicates detected outputs from one acceleration sensor with broken lines L11. FIG. 6 indicates average values of detected outputs from two acceleration sensors including the acceleration sensor used in FIG. 5 with dotted lines L12. FIG. 7 indicates output values in the physical quantity measuring apparatus 10, in this embodiment, including the two acceleration sensors used in FIG. 6 with solid lines L13. FIG. 8 is a graph illustrating changes in 3σ calculated from the values in FIGS. 5 to 7 with elapsed time. The standard deviation 6 is a value calculated for a predetermined number of immediately preceding consecutive data items (for example, consecutive 20 last data items) in data illustrated in FIGS. 5 to 7, at each detection time.

Now, FIGS. 5 to 7 will be compared. In detected outputs from one acceleration sensor (indicated by the broken lines L11 in FIG. 5), variations in the detected outputs are large in spite of the acceleration sensor being stationary, indicating an influence of noise. In the average values (indicated by the dotted lines L12 in FIG. 6) of the detected outputs from two acceleration sensors, time periods during which variations are excessive are lessened when compared with a case in FIG. 5, but the amount of variations is still large, indicating an influence of noise. However, in the output values (indicated by the solid lines L13 in FIG. 7) from the physical quantity measuring apparatus 10 in this embodiment, after an initial period during which the physical quantity measuring apparatus 10 was set has passed, variations are less and stable at values near 0, indicating that the influence of the noise was able to be suppressed.

In FIG. 8, it is found that the detected outputs (indicated by the broken lines L11) from one acceleration sensor and the average values (indicated by the dotted lines L12) of the detected outputs from two acceleration sensors have a large 3σ value and that the width of variations in the detected outputs or average values is large. In contrast to this, the output values (indicated by the solid lines L13) from the physical quantity measuring apparatus 10 in this embodiment indicate that after the initial period has passed and the output values are stabilized, the output values are always smaller than the broken lines L11 and dotted lines L12 and that the width of variations in the output values is small.

Since the physical quantity measuring apparatus 10 is structured as described above, the above embodiment provides the following effects.

(3) Since a special filter is not used and it is sufficient to use a plurality of physical quantity sensors of the same type, it is possible to suppress power consumption, the size of the apparatus, and a load applied to a computing circuit.

(4) Since processing is continued in which an output value at the immediately preceding detection time or a detected value close to this output value is selected by using a plurality of physical quantity sensors, stable output values with the influence of noise suppressed can be obtained. By comparison, a Kalman filter, for example, is based on a theory expanded from a moving average and can only average variations in detected outputs from individual sensors, so it is difficult to reliably suppress noise.

A variation will be described below.

Although an example in which two acceleration sensors are used has been described in the above embodiment, three or more acceleration sensors can also be used. In this case as well, output values can be set in a flow similar to the flow illustrated in FIG. 2. More specifically, even if three acceleration sensors are used, processing in steps S1 to S3 in FIG. 2 is performed similarly. In decision processing in next step S4, it is decided whether output value Zout(n) at the immediately preceding detection time is present between the maximum value and minimum value of the detected outputs from the three acceleration sensors. If output value Zout(n) is present between the maximum value and the minimum value, the average value of the three detected outputs is used as output value Zout(n+1) as in step S5. If output value Zout(n) is not present between the maximum value and the minimum value, the value that is included in the detected outputs from the three acceleration sensors and is closest to output value Zout(n) at the immediately preceding detection time is used as output value Zout(n+1) at the current detection time. When three or more acceleration sensors are used in this way, noise can be more easily suppressed and highly precise physical quantity computation becomes possible.

Although both of the two acceleration sensors have continued to be operated concurrently in the above embodiment, a switchover may be made so that only one acceleration sensor is operated at a time according to the situation. Control of a switchover is made by the control unit or controller 13 as a switching unit. When low power consumption is prioritized, the number of acceleration sensors to be operated at a time can be reduced to 1 and output values can be calculated according to detection results of this acceleration sensor. When measurement precision is prioritized, two acceleration sensors can be operated concurrently and output values can be calculated according to the flow illustrated in FIG. 2. This switching of sensors is also true even when three or more sensors are used. The number of sensors to be operated at a time is changed according to the situation.

The present invention has been described with reference to the above embodiment. However, the present invention is not limited to the above embodiment. It is possible to improve or change the present invention within the range of the object of improvement or the concept of the present invention.

As described above, the physical quantity measuring apparatus according to the present invention is advantageous in that power consumption, the size of the apparatus, and a load applied to a computing circuit can be suppressed and noise can also be suppressed.

What is claimed is:

1. A physical quantity measuring apparatus comprising:
a plurality of physical quantity sensors, the plurality of physical quantity sensors comprising at least two physical quantity sensors of the same type, each of which detects a physical quantity at detection times at intervals of a predetermined length of time;
a computing unit that calculates an output value according to physical quantities detected by the plurality of physical quantity sensors at each detection time; and
a deciding unit that makes a predetermined decision according to an output value calculated about an immediately preceding detection time and to physical quantities detected by the plurality of physical quantity sensors at a current detection time; wherein
the computing unit calculates an output value at each detection time according to a decision result of the deciding unit; wherein:
the deciding unit decides whether an output value calculated about an immediately preceding detection time is present between physical quantities detected by the two physical quantity sensors at a current detection time; and
the computing unit:
if the output value calculated about the immediately preceding detection time is present between the physical quantities detected by the two physical quantity sensors at the current detection time, sets an average values of the physical quantities detected by the two physical quantity sensors at the current detection time as an output value for the current detection time, and
if the output value calculated about the immediately preceding detection time is not present between the physical quantities detected by the two physical quantity sensors at the current detection time, sets either of the two physical quantity values detected at the current detection time, whichever is closer to the output value calculated about the immediately preceding detection time, as an output value about the current detection time.

2. The physical quantity measuring apparatus according to claim 1, wherein an initial output value of the output value is an average value of physical quantities detected by the plurality of physical quantity sensors at a first detection time.

3. The physical quantity measuring apparatus according to claim 1, further comprising a switching unit that changes the number of physical quantity sensors, included in the plurality of physical quantity sensors, to be operated at a time.

4. The physical quantity measuring apparatus according to claim 1, wherein the deciding unit makes a failure decision about the physical quantity measuring apparatus by comparing physical quantities detected by the plurality of physical quantity sensors.

* * * * *